(12) United States Patent
Shin

(10) Patent No.: US 11,682,337 B2
(45) Date of Patent: Jun. 20, 2023

(54) DRIVING ENVIRONMENT DISPLAY DEVICE FOR VEHICLES AND METHOD OF CONTROLLING THE SAME

(71) Applicants: HYUNDAI MOTOR COMPANY, Seoul (KR); KIA CORPORATION, Seoul (KR)

(72) Inventor: Wook Jin Shin, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/554,577

(22) Filed: Dec. 17, 2021

(65) Prior Publication Data
US 2022/0198990 A1    Jun. 23, 2022

(30) Foreign Application Priority Data
Dec. 23, 2020   (KR) .......................... 10-2020-0182406

(51) Int. Cl.
*G09G 3/20* (2006.01)
*B60K 35/00* (2006.01)

(52) U.S. Cl.
CPC .......... *G09G 3/2092* (2013.01); *B60K 35/00* (2013.01); *B60K 2370/179* (2019.05); *B60K 2370/25* (2019.05); *B60K 2370/52* (2019.05); *G09G 2340/0407* (2013.01); *G09G 2340/0464* (2013.01); *G09G 2380/10* (2013.01)

(58) Field of Classification Search
CPC ....................................................... B60R 1/00
See application file for complete search history.

(56) References Cited

U.S. PATENT DOCUMENTS

2021/0248392 A1* 8/2021 Zaheer ................ G06V 10/764

* cited by examiner

*Primary Examiner* — Nan-Ying Yang
(74) *Attorney, Agent, or Firm* — Lempia Summerfield Katz LLC

(57) ABSTRACT

Disclosed is a driving environment information display method including acquiring environment information, selecting a first seed image corresponding to a curvature of a road on which driving is performed based on the acquired environment information, from among a plurality of lane surface seed images having different curvatures, disposing the selected first seed image at a display origin corresponding to a vehicle origin, primarily distorting the first seed image in a direction toward a target lane surface that becomes a display target based on a host vehicle in response to a first lateral distance of an adjacent lane division line located in the direction toward the target lane surface, secondarily distorting the image in the direction toward the target lane surface in response to a half of the lane width of a driving lane of the host vehicle, and outputting the secondarily distorted image through a display unit.

17 Claims, 16 Drawing Sheets

DRIVING ENVIRONMENT DISPLAY DEVICE FOR VEHICLES AND METHOD OF CONTROLLING THE SAME

This application claims the benefit of and priority to Korean Patent Application No. 10-2020-0182406, filed on Dec. 23, 2020, the entire contents of which are incorporated herein by reference.

FIELD

The present disclosure relates to a driving environment display device for vehicles capable of providing various kinds of driving environment information and a method of controlling the same.

BACKGROUND

The statements in this section merely provide background information related to the present disclosure and may not constitute prior art.

With development of an advanced driver assistance system (ADAS) and autonomous driving technology, complexity in kind and configuration of information to display the operation state of a system has increased.

FIG. 1A shows an example of a driving environment information configuration provided through a cluster during autonomous driving, and FIG. 1B shows an example of a three-dimensional rendering configuration for providing driving environment information.

Referring to FIG. 1A, a lane division line 112 around a host vehicle 111, the location 113 of a nearby vehicle, and a target distance 114 from a preceding vehicle recognized by a sensor may be displayed in a portion 110 of a cluster 100, the entirety of which is configured as a display.

Since it is desired to variously change the driving environment information depending on the relative distance and azimuth between the host vehicle and the nearby vehicle and the width and curvature of a road, the driving environment information is generally implemented through three-dimensional rendering, as shown in FIG. 1B.

A display (e.g., a display of a cluster) may have a high-end processor for the three-dimensional rendering, in order to execute a 3D engine capable of processing three-dimensional graphics. If the high-end processor is not used, an individual image resource set for each distance and angle is desired to implement substantially the same driving environment information as shown in FIG. 1A without a 3D engine. Since the number of resources that are required increases in geometrical progression depending on target resolution of the distance or the angle, it is difficult to prepare image resources for all combinations in advance in the aspect of image preparation and memory capacity.

For example, on the assumption that a longitudinal distance ahead of a host vehicle is divided into 1500 steps, a lateral distance on each side of the host vehicle is divided into 140 steps, and the curvature of a lane is divided into 30 steps including left and right curvatures, the number of image resources that are desired is 6,300,000.

We have found that a method of efficiently displaying driving environment information in a display device based on a 2D graphics engine is desired rather than an engine for processing 3D graphics.

SUMMARY DISCLOSURE

The present disclosure provides a driving environment display device for vehicles and a method of controlling the same that substantially obviate one or more problems due to limitations and disadvantages of the related art.

An object of the present disclosure is to provide a driving environment display device for vehicles capable of more efficiently displaying driving environment information and a method of controlling the same.

Another object of the present disclosure is to provide a driving environment display device for vehicles capable of displaying various kinds of driving environment information based on limited resource images using a 2D graphics engine and a method of controlling the same.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the present disclosure, as embodied and broadly described herein, a driving environment information display method may include acquiring nearby environment information, selecting a first seed image corresponding to the curvature of a road on which driving is currently performed, which is a piece of the acquired environment information, from among a plurality of lane surface seed images having different curvatures, disposing the selected first seed image at a display origin corresponding to a vehicle origin, primarily distorting the first seed image disposed at the origin in a direction toward a target lane surface that becomes a display target based on a host vehicle in response to a first lateral distance of an adjacent lane division line located in the direction toward the target lane surface, secondarily distorting the primarily distorted first seed image in the direction toward the target lane surface in response to a half of the lane width of a driving lane of the host vehicle, and outputting the secondarily distorted first seed image through a display unit.

In another aspect of the present disclosure, a vehicle may include a sensor unit and navigation system configured to acquire nearby environment information and a driving environment display device configured to output driving environment information based on the acquired nearby environment information. The driving environment display device may include a controller configured to select a first seed image corresponding to the curvature of a road on which driving is currently performed, which is a piece of the acquired environment information, from among a plurality of lane surface seed images having different curvatures, to dispose the selected first seed image at a display origin corresponding to a vehicle origin, to primarily distort the first seed image disposed at the origin in a direction toward a target lane surface that becomes a display target based on a host vehicle in response to a first lateral distance of an adjacent lane division line located in the direction toward the target lane surface, and to secondarily distort the primarily distorted first seed image in the direction toward the target lane surface in response to a half of the lane width of a driving lane of the host vehicle, and a display unit configured to output the secondarily distorted first seed image.

It is to be understood that both the foregoing general description and the following detailed description of the present disclosure are exemplary and explanatory and are intended to provide further explanation of the present disclosure.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

Figure 1A:
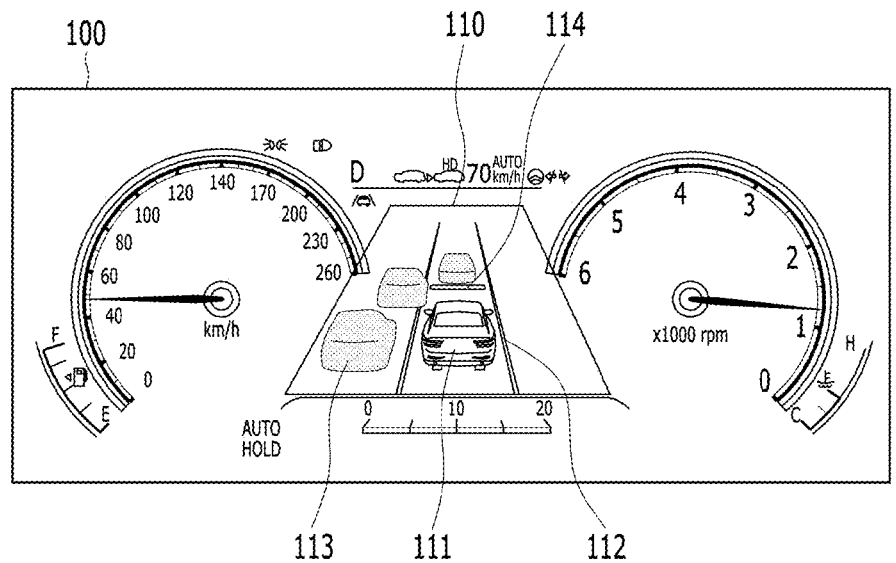
FIG. 1A shows an example of a driving environment information configuration provided through a cluster during autonomous driving.
Figure 1B:
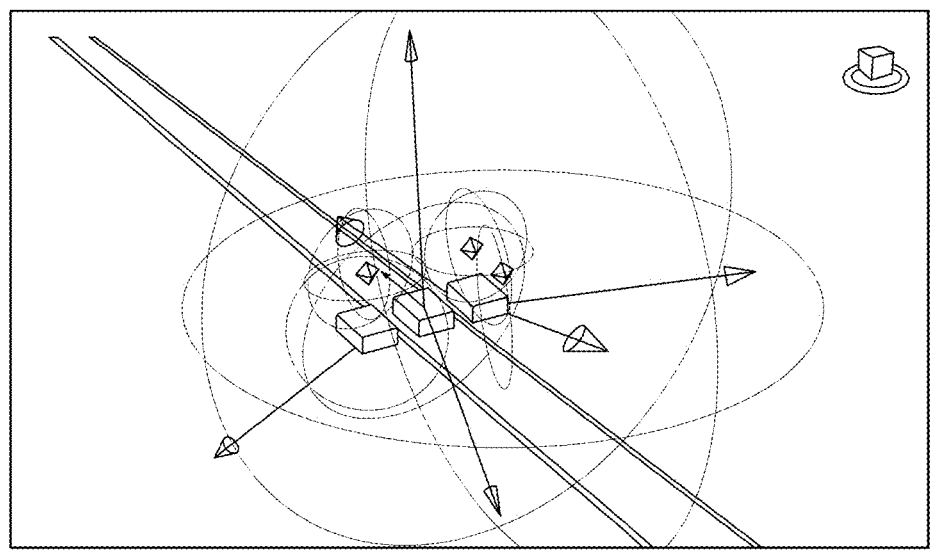
FIG. 1B shows an example of a three-dimensional rendering configuration for providing driving environment information.

The drawings described herein are for illustration purposes only and are not intended to limit the scope of the present disclosure in any way.

DETAILED DESCRIPTION

Reference will now be made in detail to embodiments of the present disclosure, examples of which are illustrated in the accompanying drawings. The following embodiments are given by way of example in order to enable those having ordinary skill in the art to fully understand the idea of the present disclosure. Therefore, the present disclosure is not limited by the following embodiments, and may be realized in various other forms. In order to clearly describe the present disclosure, parts having no relation with the description of the present disclosure have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the same reference numerals denote the same constituent elements throughout the specification.

When a component, device, element, or the like of the present disclosure is described as having a purpose or performing an operation, function, or the like, the component, device, or element should be considered herein as being "configured to" meet that purpose or to perform that operation or function.

Also, the terms, such as 'unit' or 'module', etc., should be understood as a unit that processes at least one function or operation and that may be embodied in a hardware manner (e.g., a processor), a software manner, or a combination of the hardware manner and the software manner.

Prior to description of a driving environment information display method according to embodiments of the present disclosure, the construction of a device configured to perform the method will be described first with reference to FIG. 2.

Figure 2:
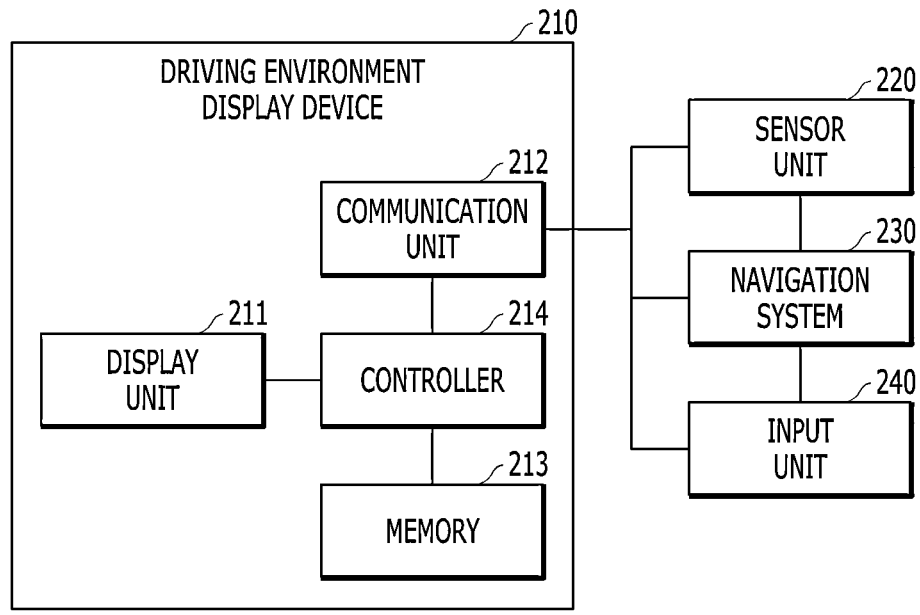
FIG. 2 is a block diagram showing an example of the construction of a vehicle according to an embodiment.

FIG. 2 is a block diagram showing an example of the construction of a vehicle according to an embodiment of the present disclosure.

Referring to FIG. 2, a vehicle applicable to embodiments may include a driving environment display device 210 for vehicles, a sensor unit 220, a navigation system 230, and an input unit 240. FIG. 2 mainly illustrates components related to embodiments of the present disclosure, and therefore an actual vehicle may include more or fewer components.

The driving environment display device 210 may include a display unit 211, a communication unit 212, a memory 213, and a controller 214.

The display unit 211 may be a display constituting a cluster; however, the present disclosure is not limited thereto. For example, the display unit 211 may be a head-up display (HHUD) or a display of an audio/video/navigation (AVN) system.

The communication unit 212 may exchange data with the sensor unit 220, the navigation system 230, and the input unit 240 over a vehicle communication network (e.g. CAN, CAN-FD, LIN, or Ethernet).

The memory 213 may store various kinds of input/output information, and particularly may store a seed image for each component of driving environment information and various reference tables for image processing, a description of which will follow.

The controller 214 may perform overall control of the components 211, 212, and 213, and particularly may perform various kinds of image processing for outputting driving environment information according to an embodiment.

The sensor unit 220 and the navigation system 230 may acquire nearby environment information desired to constitute driving environment information.

The sensor unit 220 may acquire information about the location of, a relative speed of, and a distance from an object around the vehicle, particularly a nearby vehicle. In addition, the sensor unit 220 may acquire information about a lateral distance between a lane division line and a host vehicle and curvature of the lane division line through lane division line detection. The sensor unit 220 may include at least one of a radar, a lidar, a vision sensor, an ultrasonic sensor, and an infrared sensor, which, however, are illustrative, and the kind of the sensor unit is not restricted as long as it is possible to acquire driving environment information around the host vehicle.

The navigation system 230 may be mounted in the AVN system or a head unit; however, the present disclosure is not limited thereto. The navigation system 230 may acquire curvature information of a forward road based on the current location determined through GPS. Depending on embodiments, the navigation system 230 may provide road width information for each lane division line depending on lane link based on a precise map.

The input unit 240 may allow a user to input a command for entry into a mode in which a driving environment is displayed (e.g. autonomous driving enabling) and a target inter-vehicle distance setting command.

Figure 3A:
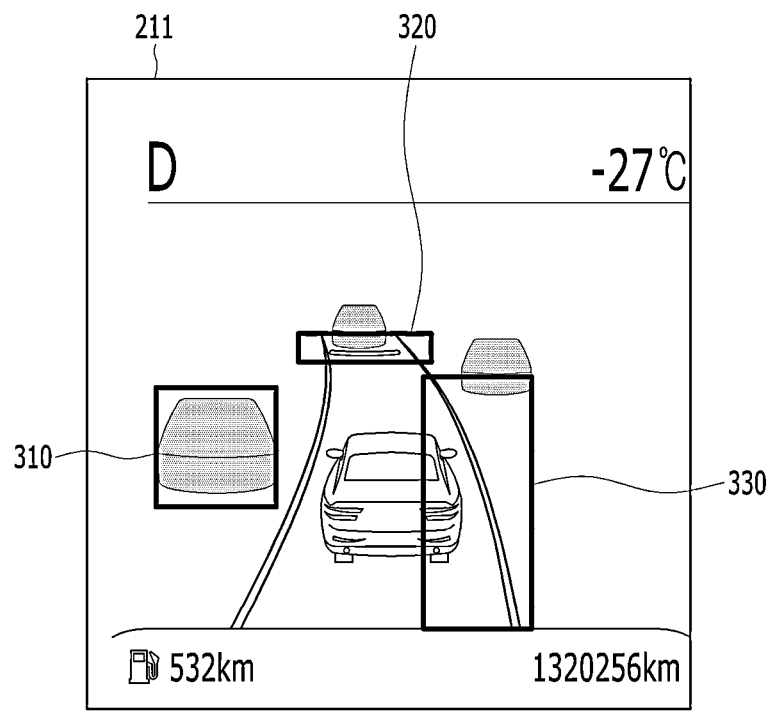
FIGS. 3A and 3B show components of driving environment information output in accordance with an embodiment.
Figure 3B:
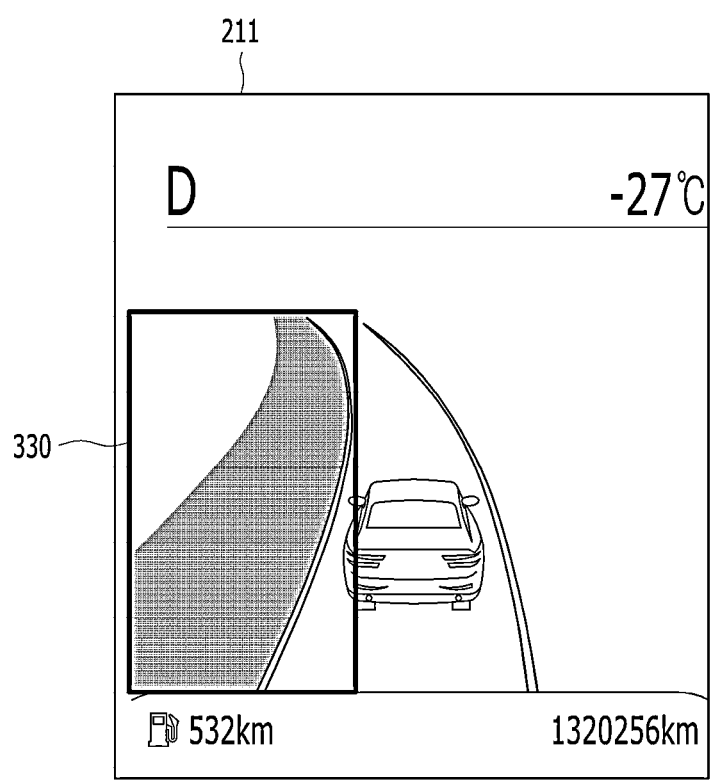

FIGS. 3A and 3B show components of driving environment information output in accordance with an embodiment.

Referring to FIGS. 3A and 3B, the driving environment information according to the embodiment may include three main components, such as information of a nearby vehicle 310, a target inter-vehicle distance 320, and information of a lane surface 330.

The nearby vehicle 310 is a concept including not only a vehicle located ahead of the host vehicle traveling on the current driving lane but also a vehicle traveling on a lane on the left/right side of the driving lane. A plurality of nearby vehicles 310 may be displayed as long as the vehicles are located within a sensing range of the sensor unit 220 or a peripheral range to be expressed by driving environment information.

The target inter-vehicle distance 320, which is a target distance from a preceding vehicle to be maintained by operation of a longitudinal autonomous driving system, may be changed depending on a set distance on the driving lane of the host vehicle.

The information of the lane surface 330 provides the shape of a lane surface of the driving lane, the left lane, or the right lane depending on the curvature of the driving lane of the host vehicle. The information of the lane surface 330 may be used to indicate a target lane to which the vehicle desires to move through lane change in the driving lane in an autonomous driving situation; however, the present disclosure is not limited thereto. For example, the information of lane surface 330 may be used to inform a driver of a recommended lane at the time of route guidance.

Figure 4:
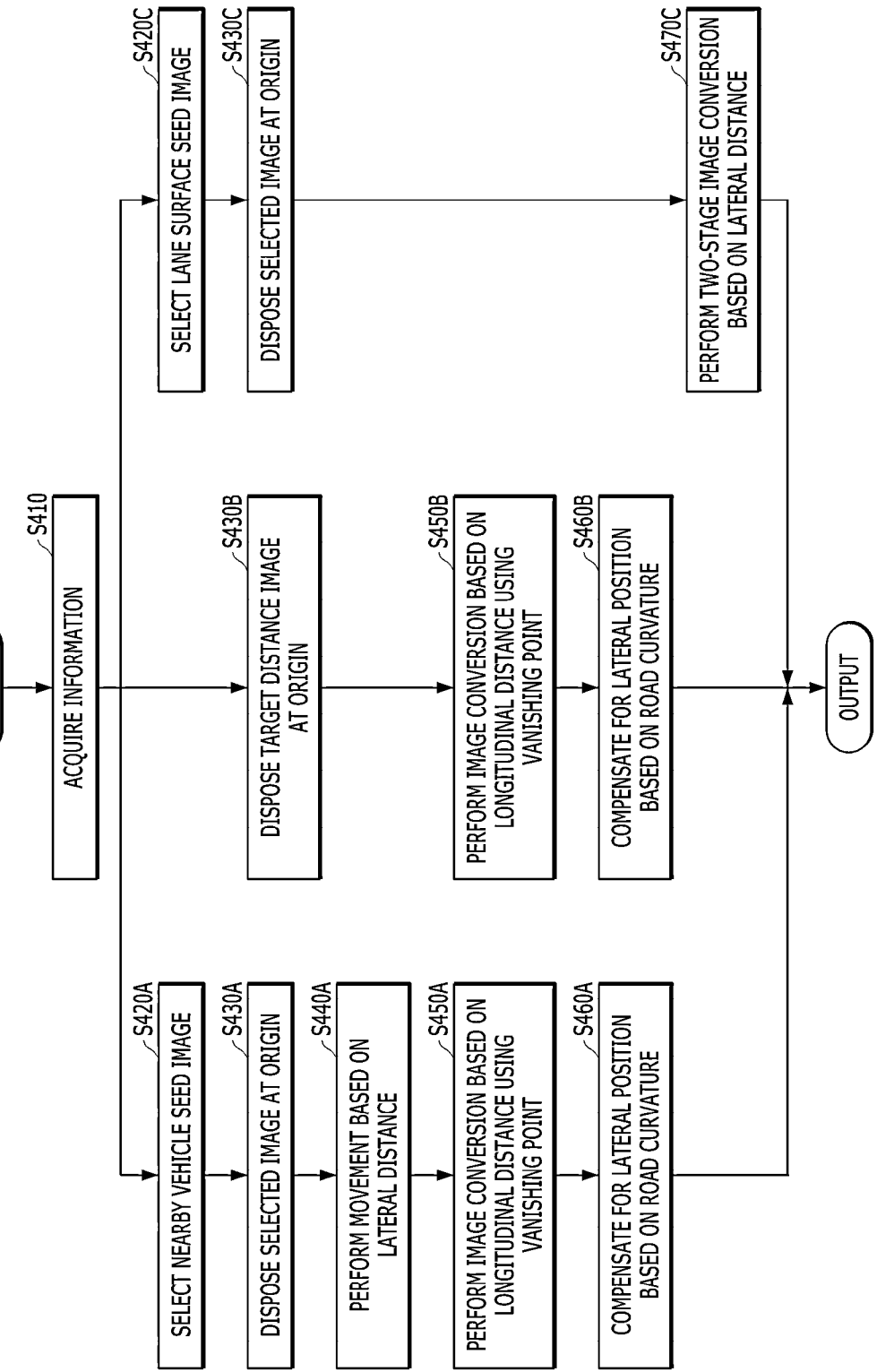
FIG. 4 is a flowchart showing an example of a driving environment information display process according to an embodiment.

FIG. 4 is a flowchart showing an example of a driving environment information display process according to an embodiment of the present disclosure.

Referring to FIG. 4, the driving environment information display process according to the embodiment may be mainly divided into an information acquisition process (S410) and an image processing process. The image processing process may be divided into a first image processing process for a nearby vehicle (S420A to S460A), a second image processing process for a target inter-vehicle distance (S430B to S460B), and a third image processing process for a lane surface (S420C to S470C).

First, the information acquisition process (S410) may be a process of acquiring, by the controller 214, information desired to display nearby environment information from the sensor unit 220, the navigation system 230, and the input unit 240 through the communication unit 212. Kinds of information that is acquired are the same as described above, and duplicate description will be omitted.

When information desired to display nearby environment information is acquired, the controller 214 may perform image processing for each component of the nearby environment information.

The first image processing process for the nearby vehicle (S420A to S460A) is described with reference to FIGS. 5 to 7D.

Figure 5:
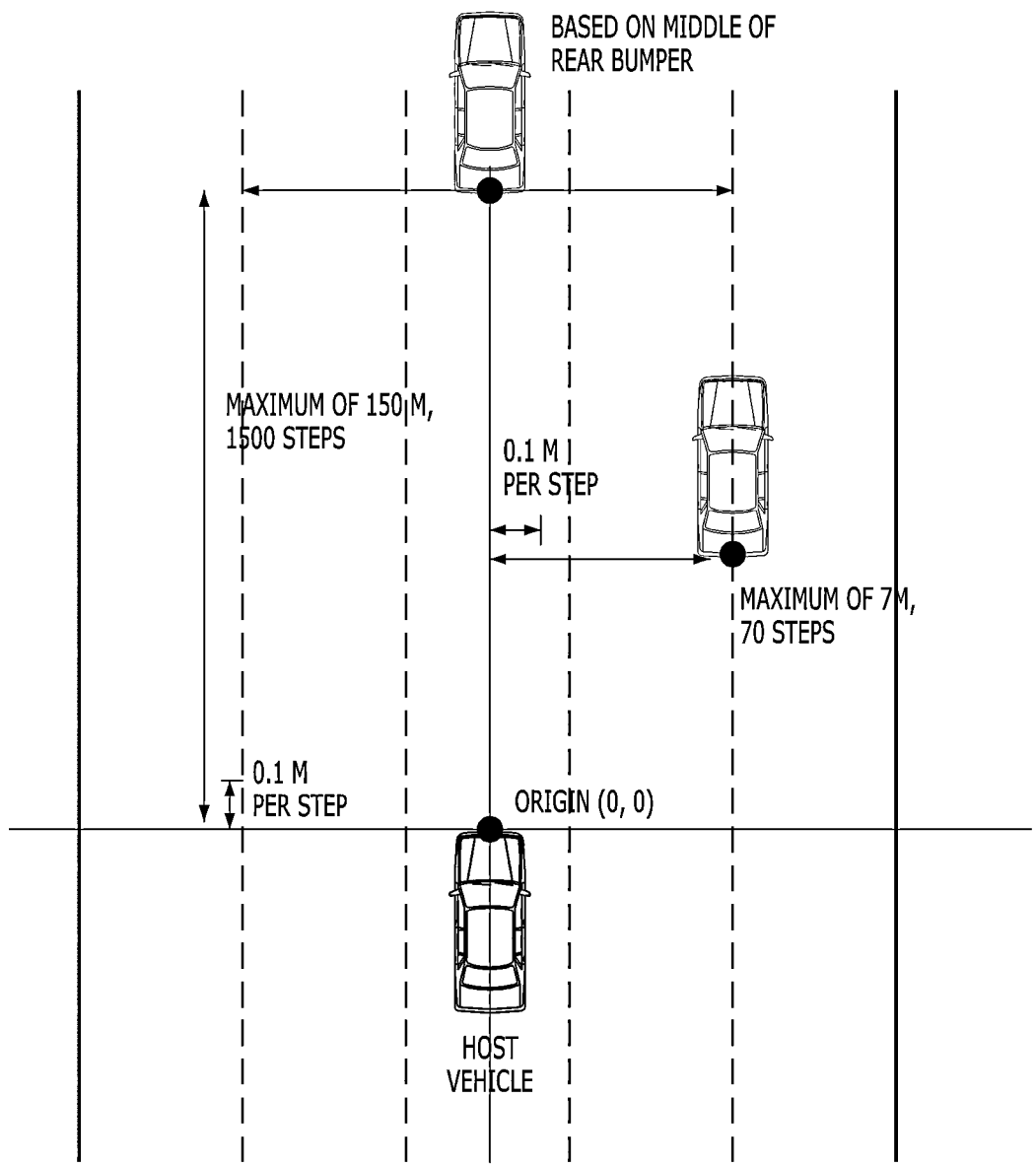
FIG. 5 shows an example of reference information and resolution for displaying a nearby vehicle according to an embodiment.
Figure 6:
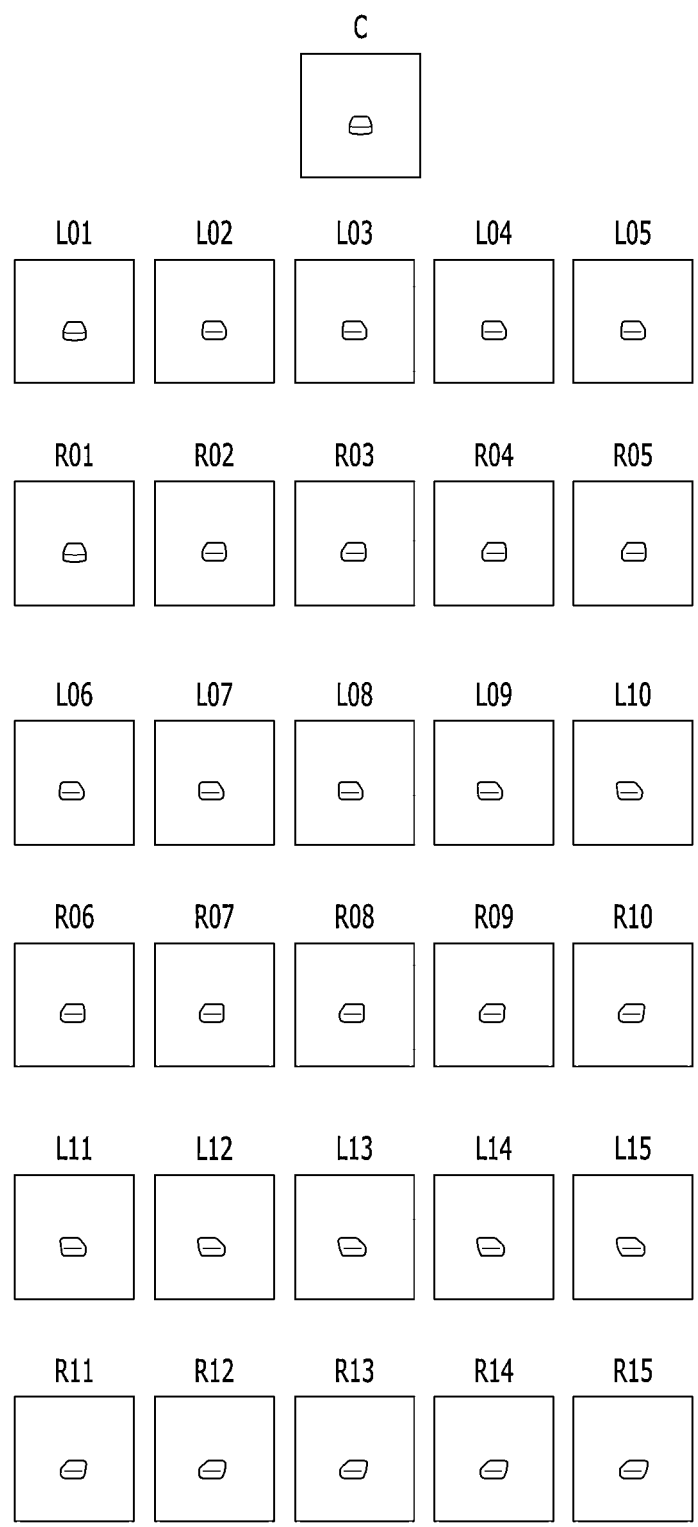
FIG. 6 shows an example of the construction of a seed image for displaying a nearby vehicle according to an embodiment.

FIG. 5 shows an example of reference information and resolution for displaying a nearby vehicle according to an embodiment. FIG. 6 shows an example of the construction of a seed image for displaying a nearby vehicle according to an embodiment. FIGS. 7A to 7D show an example of an image processing process for displaying a nearby vehicle according to an embodiment.

Referring first to FIG. 5, reference information for displaying a nearby vehicle includes a lateral distance and a longitudinal distance between the nearby vehicle and the host vehicle. At this time, the origin (0, 0) of a coordinate system may be provided at the middle of a front buffer of the host vehicle, and the location of the nearby vehicle is based on the distance between the origin and the middle of a rear bumper of the nearby vehicle. The reason for this is that the sensor unit 220 is disposed around the front buffer of the host vehicle and the sensor unit 220 senses the distance from the rear bumper of the preceding vehicle; however, it is obvious to those having ordinary skill in the art that this criterion is changeable. In order to distinguish from the origin of a region displaying nearby environment information on the display unit 211, a description of which follows, an origin indicating the positional relationship between an actual vehicle and a nearby object (a lane division line, a nearby vehicle, etc.) may be referred to as a "vehicle origin." In addition, the position of the region displaying nearby environment information on the display unit 211 corresponding to the origin of the vehicle may be referred to as a "display origin."

In addition, the longitudinal distance may range from the host vehicle to a maximum of 150 m ahead, and the lateral distance may range from the host vehicle to 7 m left and right each, as a display range of nearby environment information, and the step division based on which movement/deformation is caused at the time of image processing may be set to 0.1 m. In this case, the longitudinal distance may be divided into 1500 steps, and the lateral distance may be divided into 70 steps (i.e. a total of 141 steps including "0," which is the middle). Of course, the maximum distance in each direction and step division are illustrative, and various changes are possible.

For example, the actual longitudinal distance based on a longitudinal signal value transmitted from the sensor unit 220 may be defined as shown in Table 1, and the actual lateral distance based on a left lateral signal value transmitted from the sensor unit 220 may be defined as shown in Table 2. Here, it is desired that any one of a signal corresponding to the left lateral distance and a signal corresponding to the right lateral distance is input to a nearby vehicle.

TABLE 1

| Longitudinal distance of nearby vehicle | |
|---|---|
| Signal value | Actual distance (m) |
| 0 | 0 |
| 1 | 0.1 |
| 2 | 0.2 |
| ... | ... |
| 100 | 10 |
| ... | ... |
| 1000 | 100 |
| ... | ... |
| 1500 | 150 |

TABLE 2

| Left lateral distance of nearby vehicle | |
|---|---|
| Signal value | Actual distance (m) |
| 0 | 0 |
| 1 | 0.1 |
| 2 | 0.2 |
| . . . | . . . |
| 70 | 7 |

Referring to FIG. 6, a seed image set for displaying a nearby vehicle located within the relative lateral distance and longitudinal distance from the host vehicle driving on a road having specific curvature is shown.

The seed image set may include a total of 31 images, including a seed image C of a vehicle facing forward without being biased to the left and right (i.e. having a lateral distance of 0), seed images L01 to L15 of a vehicle showing the left surface of the vehicle depending on the curvature of a road and the lateral distance of the vehicle, and seed images R01 to R15 of a vehicle showing the right surface of the vehicle depending on the curvature of a road and the lateral distance of the vehicle. In FIG. 6, seed images having directivity are divided into 15 steps in each direction, which, however, is illustrative, and the present disclosure is not limited thereto. Depending on implementation, seed images showing one of the right surface and the left surface of the vehicle may be prepared, and the seed images may be reversed between left and right when seed images in the opposite direction are needed.

For image processing of a nearby vehicle, a seed image may be selected first (S420A). For example, the controller 214 may select one of a plurality of seed images of the nearby vehicle prepared in advance in consideration of the curvature of a lane, the lateral distance, and the longitudinal distance. To this end, the controller 214 may refer to a predetermined table that defines a seed image corresponding to a combination of the curvature of the lane, the lateral distance, and the longitudinal distance.

Figure 7A:
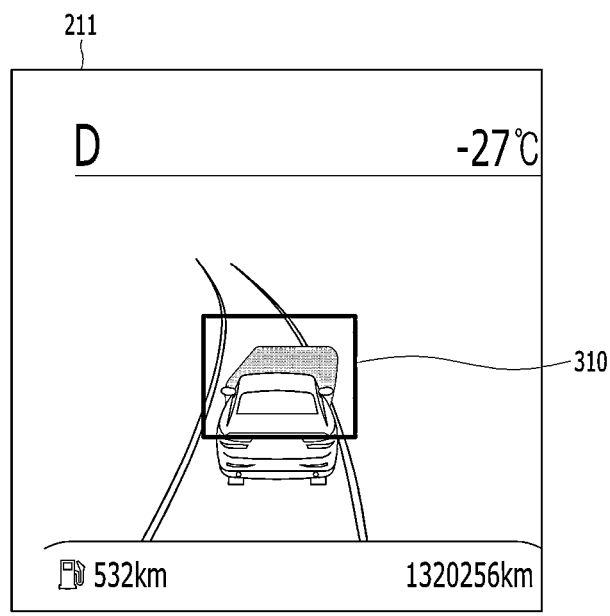
FIGS. 7A to 7D show an example of an image processing process for displaying a nearby vehicle according to an embodiment.

When the seed image for displaying the nearby vehicle is selected, the controller 214 may locate an image 310 at the origin (i.e. the display origin), as shown in FIG. 7A (S430A).

Figure 7B:
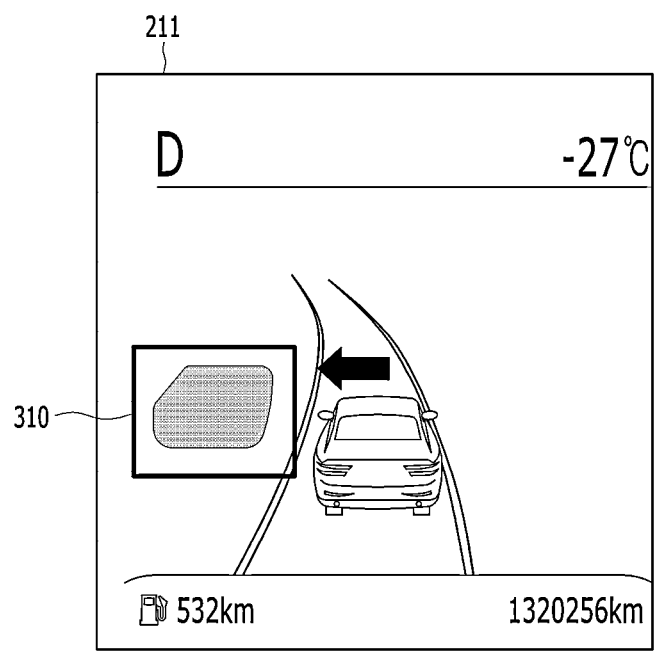

Subsequently, the controller 214 may convert lateral coordinates of the image 310 based on the lateral distance between the nearby vehicle and the host vehicle, as shown in FIG. 7B (S440A). For example, on the assumption that the display unit 211 has a resolution of 1280×720, the lateral coordinates of the image 310 may be moved by 7 pixels per lateral distance of 0.1 m (i.e. one step).

Figure 7C:
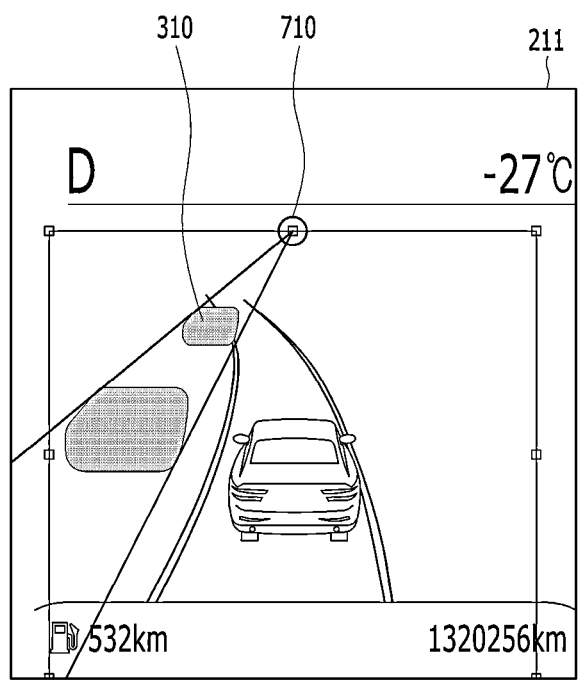

In addition, the controller 214 may convert the size of the image 310 in proportion to the longitudinal distance within which the nearby vehicle is displayed using a vanishing point 710 of the lane as an anchor point, as shown in FIG. 7C (5450A). Here, the vanishing point may be a point at which opposite lane division lines around the host vehicle join each other ahead of the middle of the host vehicle on a straight road having no curvature. In addition, size conversion may be performed so as to be contracted when the longitudinal distance is based on the front of the host vehicle and may be performed so as to be extended when the longitudinal distance is based on the rear of the host vehicle. During size conversion, the coordinates may be moved in the longitudinal direction and the lateral direction by following a reference point. In addition, for a size conversion rate, a table prepared for each longitudinal distance may be referenced.

Figure 7D:
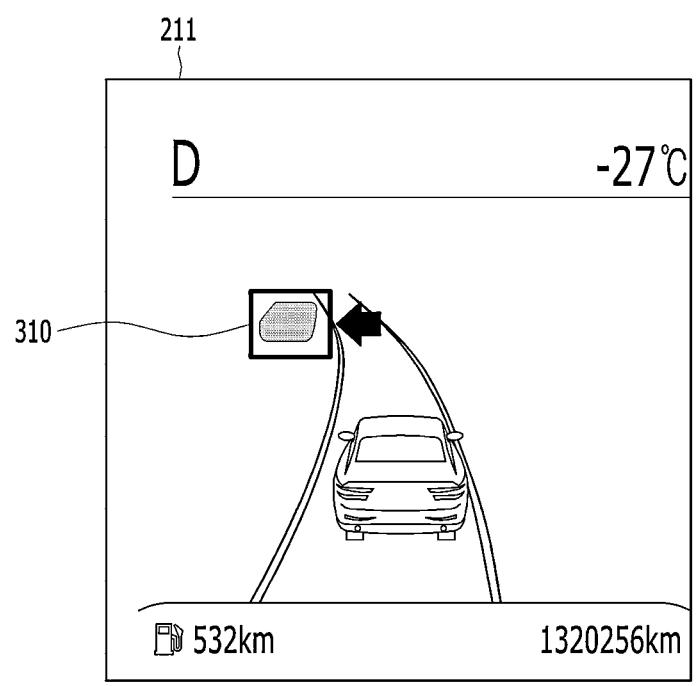

Subsequently, the controller 214 may compensate for the lateral coordinates of the vehicle image generated depending on the curvature of the lane, as shown in FIG. 7D (S460A). The compensation amount of the lateral coordinates, i.e. the movement amount of the image 310 in the lateral direction, may be determined with reference to a table having movement amounts defined depending on the curvature of the lane and the longitudinal distance.

Next, the image processing process for the target inter-vehicle distance (S430B to S460B) will be described with reference to FIGS. 8 to 9C.

Figure 8:
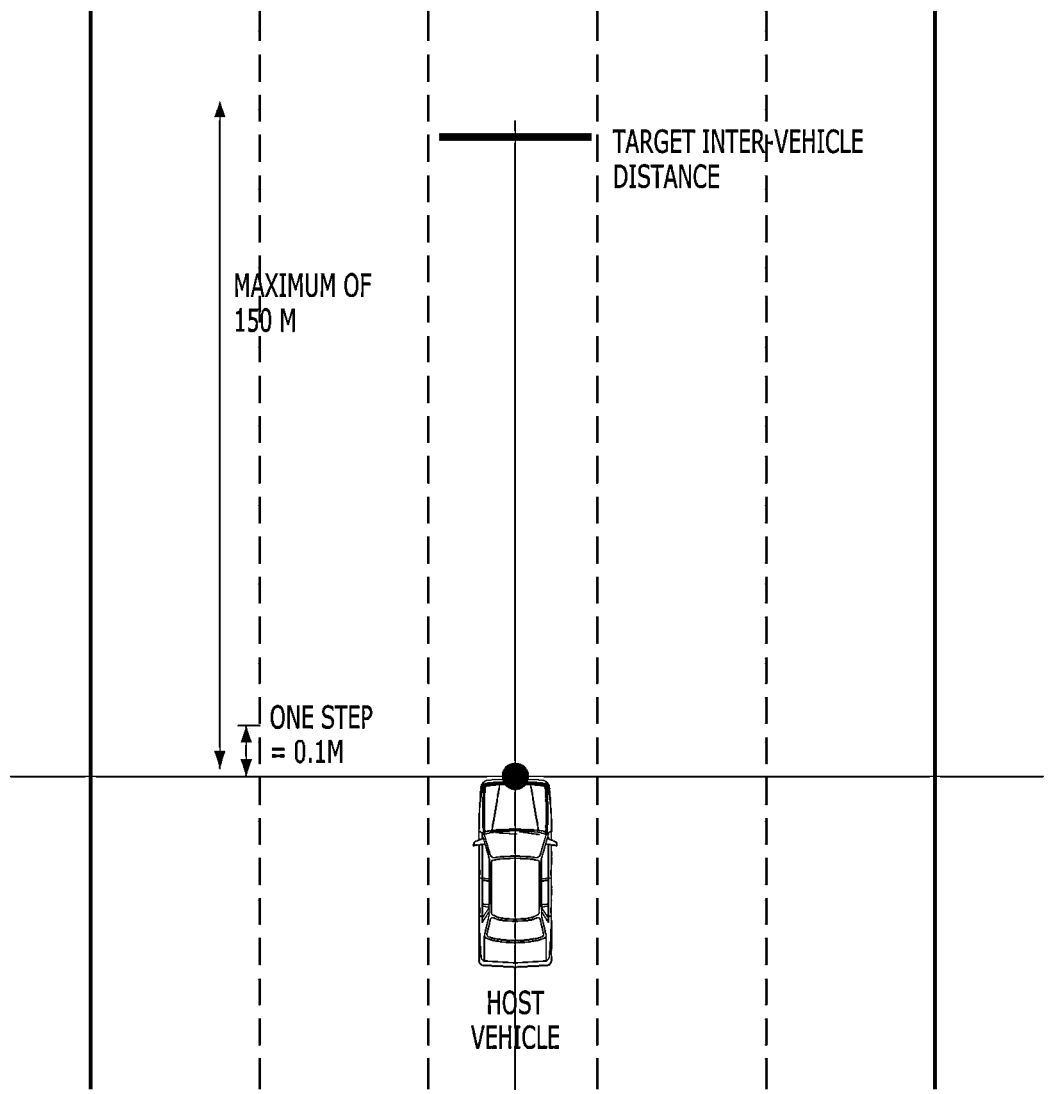
FIG. 8 shows an example of reference information and resolution for displaying a target inter-vehicle distance according to an embodiment.

FIG. 8 shows an example of reference information and resolution for displaying a target inter-vehicle distance according to an embodiment. In addition, FIGS. 9A to 9C show an example of an image processing process for displaying a target inter-vehicle distance according to an embodiment.

Referring first to FIG. 8, the reference information for displaying the target inter-vehicle distance may be defined as a longitudinal distance based on the vehicle origin of the host vehicle, which is a set target inter-vehicle distance. The longitudinal distance may range from the host vehicle to a maximum of 150 m ahead, and the step division based on which deformation is caused at the time of image processing may be set to 0.1 m. In this case, the longitudinal distance may be divided into 1500 steps. Of course, the maximum distance and step division are illustrative, and various changes are possible.

For example, the set target inter-vehicle distance and a signal value may be provided as shown in Table 1 above.

Figure 9A:
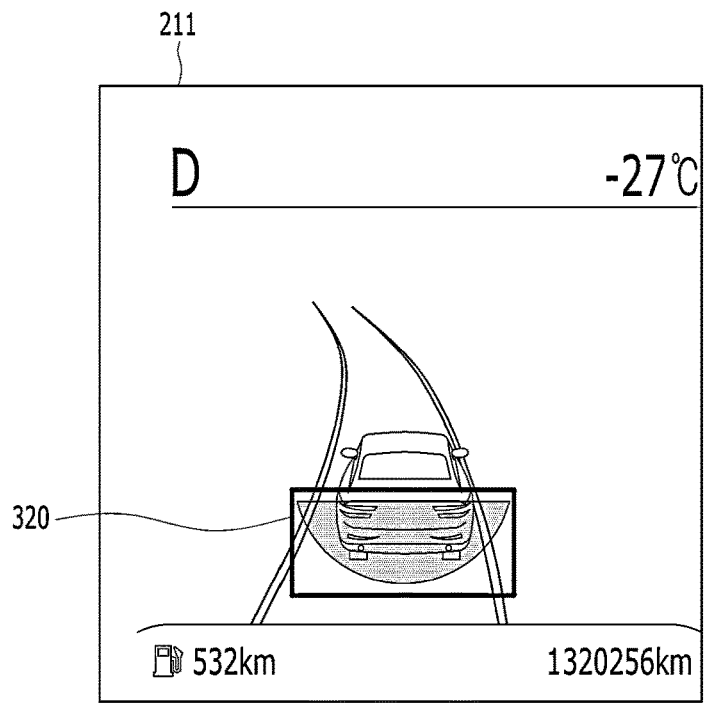
FIGS. 9A to 9C show an example of an image processing process for displaying a target inter-vehicle distance according to an embodiment.
Figure 9B:
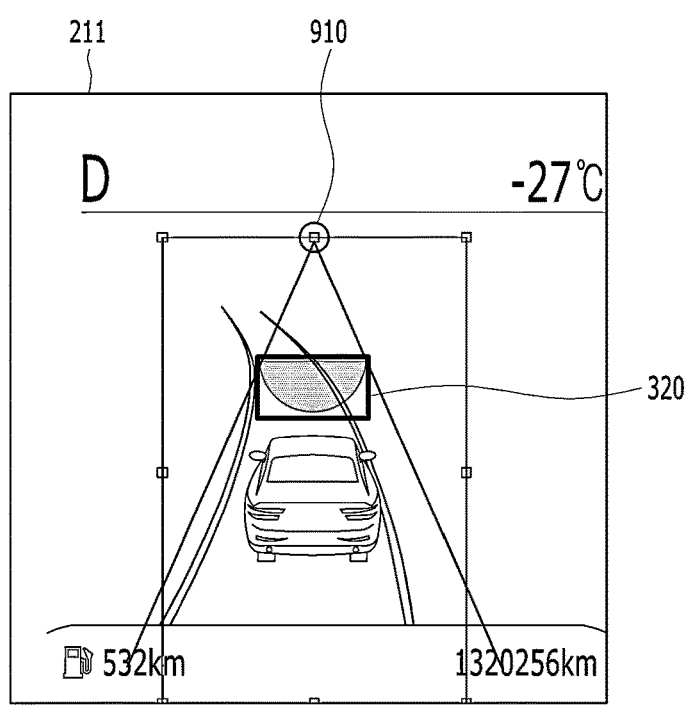

In order to perform image processing for the target inter-vehicle distance, the controller 214 may locate an image 320 at the origin (i.e. the display origin), as shown in FIG. 9A (S430A). At this time, the target inter-vehicle distance has no directivity, and therefore a single seed image is used.

In addition, the controller 214 may convert the size of the image 320 in proportion to the set target inter-vehicle distance using a vanishing point 910 of the lane as an anchor point, as show in FIG. 9B (S450B). At this time, for a size conversion rate, a table prepared for each longitudinal distance may be referenced.

Figure 9C:
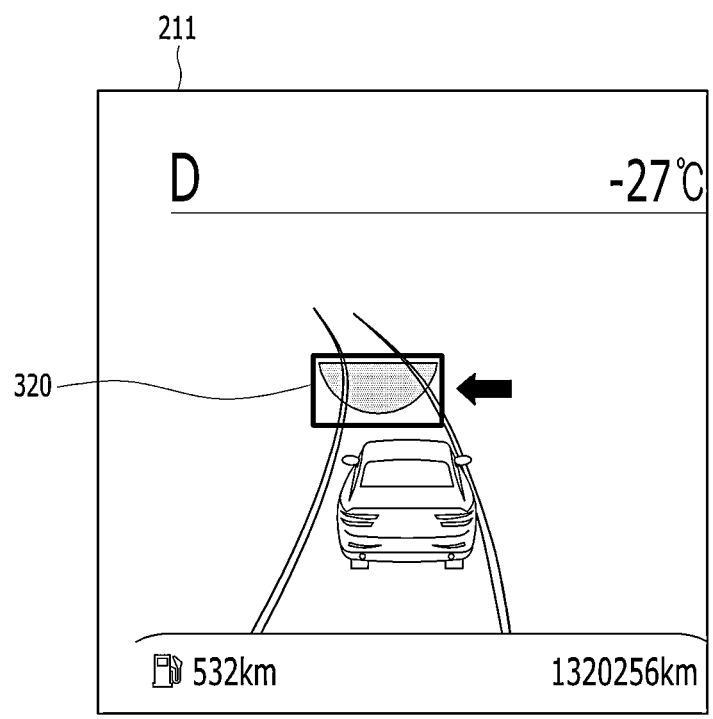

Subsequently, the controller 214 may compensate for the lateral coordinates of the target inter-vehicle distance image generated depending on the curvature of the lane, as shown in FIG. 9C (S460B). The compensation amount of the lateral coordinates, i.e. the movement amount of the image 320 in the lateral direction, may be determined with reference to a table having movement amounts defined depending on the curvature of the lane and the longitudinal distance.

The image processing process for the lane surface (S420C to S470C) will be described with reference to FIGS. 10 to 12D.

Figure 10:
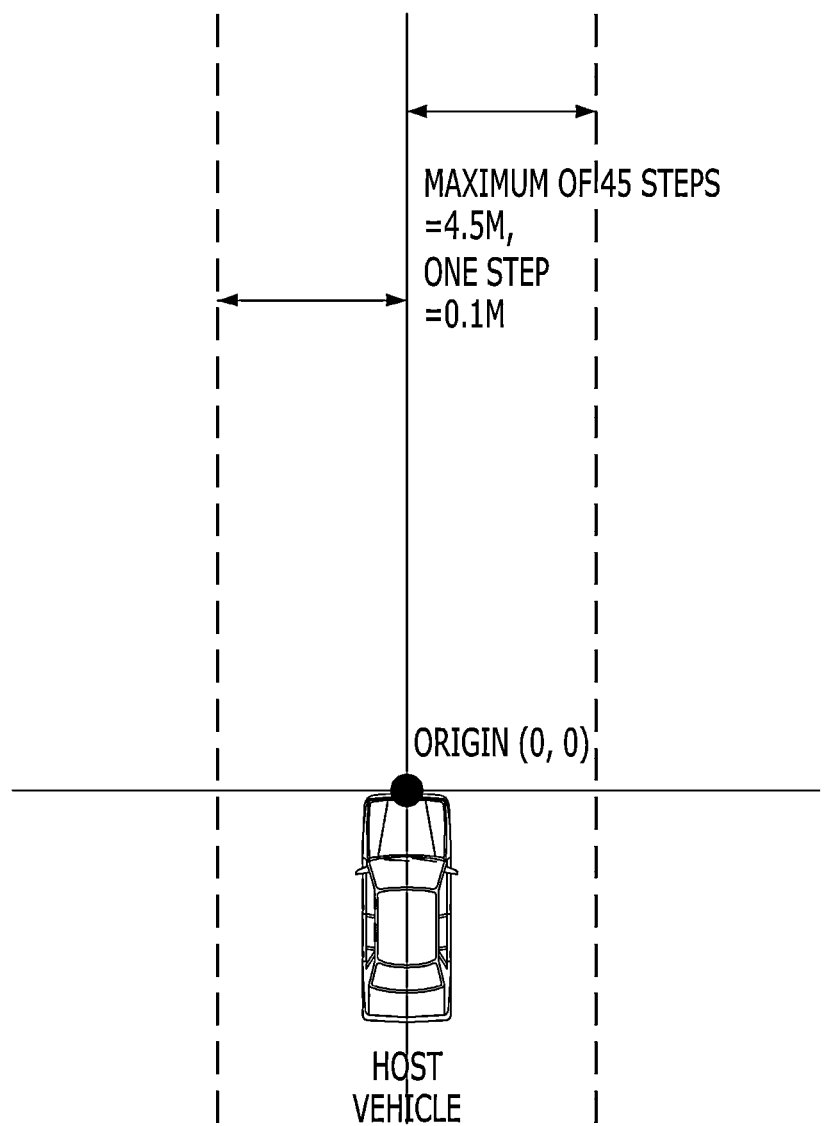
FIG. 10 shows an example of reference information and resolution for displaying a lane division line according to an embodiment.
Figure 11:
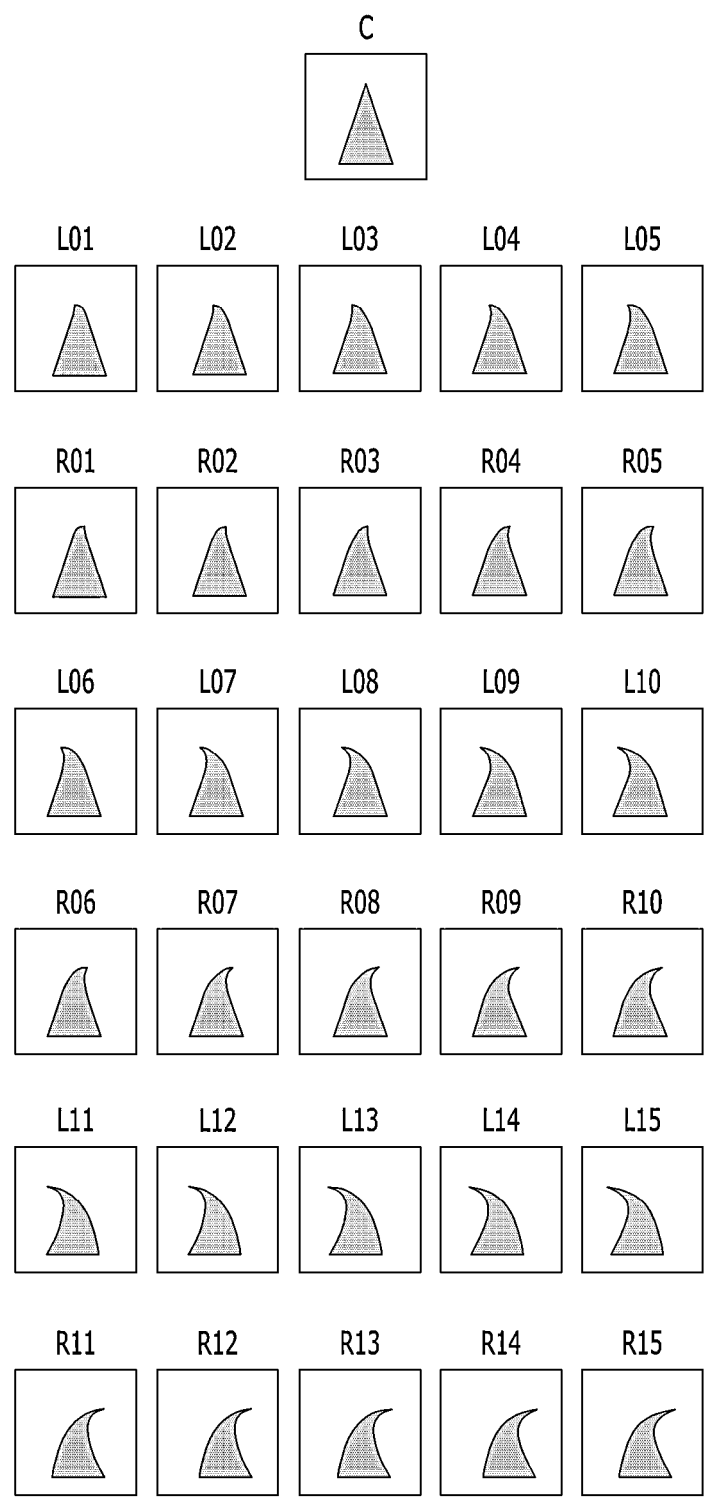
FIG. 11 shows an example of the construction of a seed image for displaying a lane division line according to an embodiment.

FIG. 10 shows an example of reference information and resolution for displaying a lane division line according to an embodiment. FIG. 11 shows an example of the construction of a seed image for displaying a lane division line according to an embodiment. In addition, FIGS. 12A to 12D show an example of an image processing process for displaying a lane division line according to an embodiment. It is assumed that lane division lines located on left and right sides of a host vehicle image shown in FIGS. 12A to 12D have already been acquired so as to have shapes corresponding to actual lane division line shapes using a predetermined method.

Referring first to FIG. 10, the reference information for displaying the lane division line includes a lateral distance between the host vehicle and the left lane division line and a lateral distance between the host vehicle and the right lane division line. The lateral distance may range from the host vehicle to 4.5 m left and right each as a display range, and the step division based on which deformation is caused at the time of image processing may be set to 0.1 m. Of course, the maximum distance in each direction and step division are illustrative, and various changes are possible.

Referring next to FIG. 11, a seed image set for displaying a left lane division line and a right lane division line of the lane on which the host vehicle currently drives is shown.

The seed image set may include a total of 31 images, including a seed image C for displaying a straight lane surface having no curvature, seed images L01 to L15 of a lane division line for displaying a lane surface having curvature to the left, and seed images R01 to R15 of a lane division line for displaying a lane surface having curvature to the right. In FIG. 11, seed images having directivity are divided into 15 steps in each direction, which, however, is illustrative, and the present disclosure is not limited thereto. Depending on implementation, seed images having one of the right curvature and the left curvature may be prepared, and the seed images may be reversed between left and right when seed images in the opposite direction are needed.

For image processing of a lane surface, a seed image may be selected first (S420C). For example, the controller 214 may select one of a plurality of seed images of the lane surface prepared in advance in consideration of the curvature of a road. To this end, the controller 214 may refer to a predetermined table that defines a seed image corresponding to the curvature of the road.

Figure 12A:
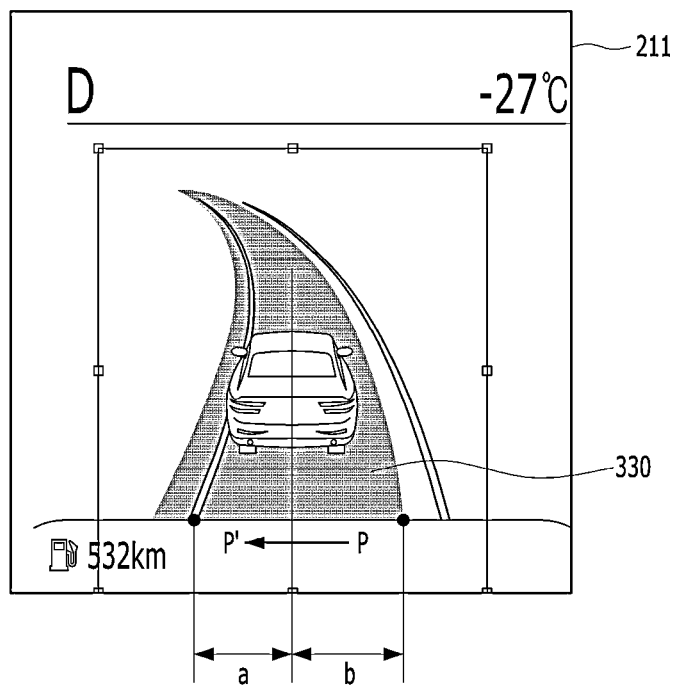
FIGS. 12A to 12D show an example of an image processing process for displaying a lane division line according to an embodiment.

When the seed image for displaying the lane surface is selected, the controller 214 may locate the image 330 at the origin (i.e. the display origin), as shown in FIG. 12A (S430C).

Subsequently, the controller 214 may perform two-stage conversion of the lane surface image 330 disposed at the origin depending on a lane to be displayed (S470C).

Figure 12B:
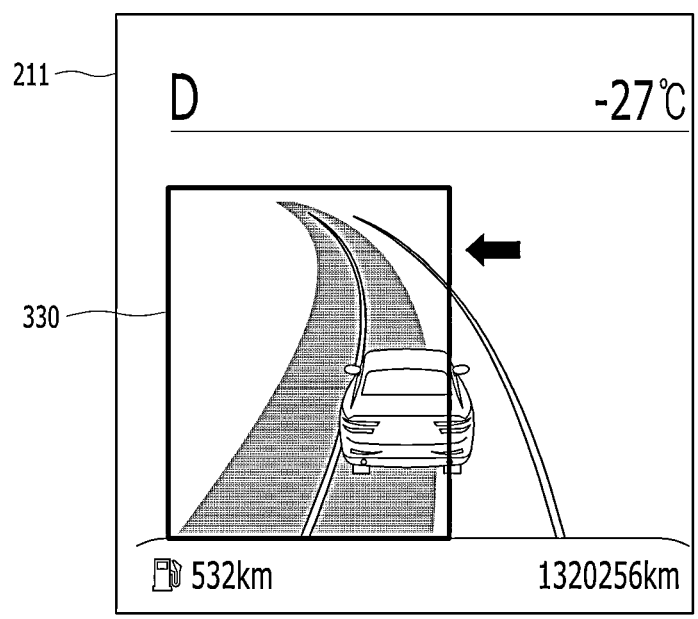
Figure 12C:
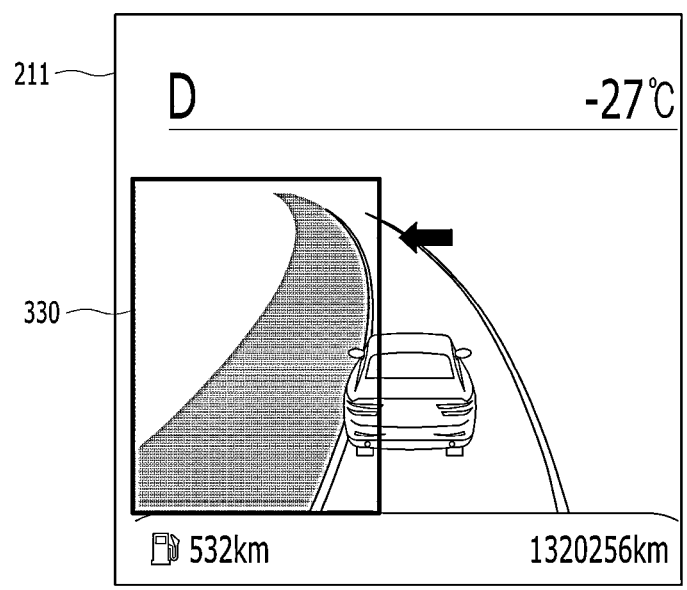
Figure 12D:
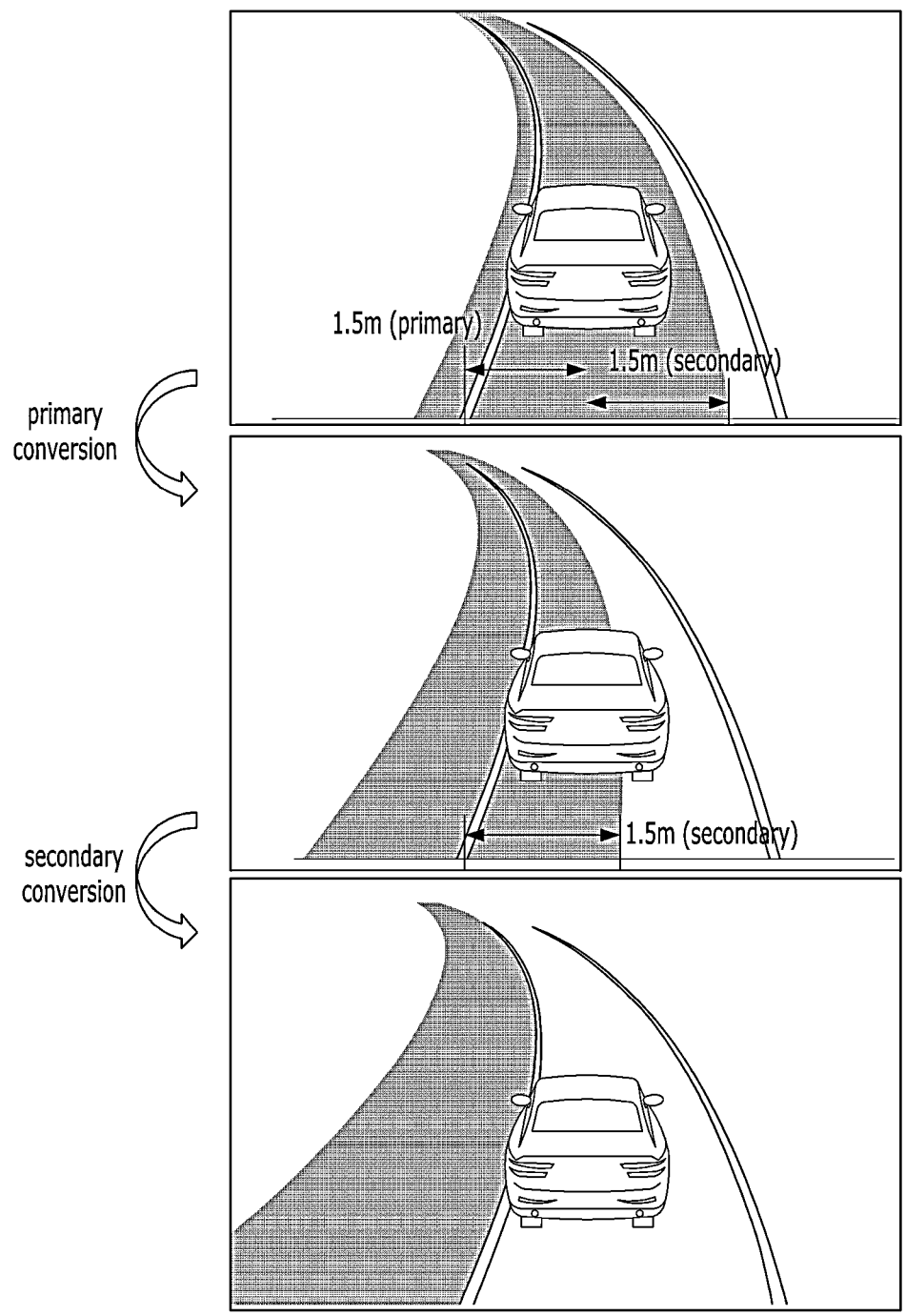

For example, it is assumed that the lane surface desired to be shown in FIGS. 12B to 12D is a lane on the left side of the host vehicle driving lane, the lateral distance between the lane division line on the left side of the host vehicle and the vehicle origin is 1 m, and the lateral distance between the lane division line on the right side of the host vehicle and the vehicle origin is 2 m, i.e. the width of the lane is 3 m.

In this case, in order for the lane surface seed image 330 to correspond to the position corresponding to the left lane, the controller 214 may perform conversion such that the right lower edge position P of the seed image 330 is displayed at the position P' of the left lane division line, as shown in FIG. 12A. Since the proportional distance to be converted is the lateral distance of the left lane division line (a) +½ of the lateral width of the lane surface (b), therefore, the controller 214 must perform distortion function transform corresponding to a and b. On the above assumption, a is 1 m, and b is 1.5 m, which is a half of the lane width, i.e. 3 m.

Of course, when the right lane surface is to be displayed, the proportional distance to be converted needs distortion function transform for lateral distance of the right lane division line +½ of the lateral width of the lane surface When left conversion is performed first, the controller 214 may perform distortion function transform in proportion to the lateral distance of the left lane division line using a vanishing point of the lane as an anchor point, as show in FIG. 12B. Here, the distortion function transform may include horizontal skew transform. For example, for an 8-inch display having a resolution of 1280×720, horizontal skew transform of +1.29° may be performed per lateral distance to be moved of 0.1 m. The lateral distance is positive (+) to the right and negative (−) to the left. That is, as shown in FIG. 12B, when the lateral distance of the left lane division line is 1 m, horizontal skew transform of −12.9° corresponding to −1 m is performed.

Next, the controller 214 may perform skew transform for the seed image converted once using the same anchor point to the left side by a distance corresponding to a half of the lane width, as shown in FIG. 12C. That is, the controller 214 may perform horizontal skew transform of −19.35° corresponding to −1.5 m.

In brief, as the two-stage conversion for displaying the lane surface, i) conversion is performed once in a direction toward a target lane surface that becomes a display target based on the host vehicle in response to the lateral distance of an adjacent lane division line located in the direction toward the target lane surface, and ii) conversion is performed once in the direction toward the target lane surface in response to a half of the lane width of the driving lane (i.e. the lateral distance of the left lane division line of the host vehicle driving lane + the lateral distance of the right lane division line thereof).

The two-stage conversion is shown in FIG. 12D, and it can be seen that the right edge of the left lane surface is converted so as to abut the left lane of the host vehicle through such conversion.

In the above embodiments, the process of converting each seed image (e.g. origin disposition, horizontal coordinates movement, size conversion, and skew) has been described as an individual process with reference to the drawings for clear understanding. However, an image during conversion may not be output through the display unit 211, and only an image finally converted for each display element may be actually output through the display unit 211. For example, an image corresponding to a nearby vehicle is finally displayed after step S460A of FIG. 4, and an image corresponding to a target inter-vehicle distance is finally displayed after step S460B of FIG. 4.

It is possible to display various driving situations by deforming a limited seed image set using the above method. This method is capable of being performed even by a relatively low-end processor having no 3D engine.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, a driving environment display device for vehicles related to at least one embodiment of the present disclosure is capable of efficiently displaying driving environment information.

In particular, it is possible to display various kinds of driving environment information by performing parallel movement based on distance, resizing based on a vanishing point, and positional compensation and inflection processing based on road curvature for a 2D seed image prepared in advance, similarly to the case in which a 3D engine is applied.

It will be appreciated by those having ordinary skill in the art that the effects achievable through the present disclosure are not limited to those that have been particularly described hereinabove and that other effects of the present disclosure should be more clearly understood from the above detailed description.

The above detailed description is not to be construed as limiting the present disclosure in any aspect, but is to be considered by way of example. The scope of the present disclosure should be interpreted as including all equivalent modifications made without departing from the scope of the present disclosure.

What is claimed is:

1. A display method for a driving environment display device to display driving environment information, the display method comprising:
    acquiring environment information;
    selecting, among a plurality of lane surface seed images having different curvatures, a first seed image corresponding to a curvature of a road on which driving of a vehicle is currently performed based on the acquired environment information;
    disposing the selected first seed image at a display origin corresponding to a vehicle origin;
    primarily distorting the first seed image disposed at the display origin in a direction toward a target lane surface that becomes a display target based on a host vehicle in response to a first lateral distance of an adjacent lane division line located in the direction toward the target lane surface;
    secondarily distorting the primarily distorted first seed image in the direction toward the target lane surface in response to a half of a lane width of a driving lane of the host vehicle;
    selecting a second seed image corresponding to a third lateral distance between a nearby vehicle and the vehicle origin, a first longitudinal distance therebetween, and the curvature of the road based on the acquired environment information, from among a plurality of vehicle seed images having shapes viewed at different angles;
    converting the selected second seed image based on the third lateral distance, the first longitudinal distance, and the curvature of the road; and
    outputting the secondarily distorted first seed image through a display unit.

2. The display method according to claim 1, wherein the vehicle origin is a position corresponding to a middle of the host vehicle in a lateral direction.

3. The display method according to claim 2, wherein:
    the first lateral distance corresponds to a distance from the vehicle origin to the adjacent lane division line, and
    the lane width is a value obtained by adding the first lateral distance to a second lateral distance from the vehicle origin to a lane division line located in an opposite direction to the adjacent lane division line.

4. The display method according to claim 1, wherein the distortion comprises skew function transform applied horizontally by an angle corresponding to the first lateral distance or the half of the lane width using a vanishing point of a lane having a curvature of 0 as an anchor point.

5. The display method according to claim 1, wherein converting the selected second seed image comprises:
    disposing the selected second seed image at the display origin;
    horizontally moving coordinates of the selected second seed image disposed at the display origin in response to the third lateral distance;
    converting a size of the second seed image having the moved coordinates based on the first longitudinal distance using a vanishing point of a lane having a curvature of zero (0) as an anchor point; and
    compensating for lateral coordinates of the second seed image having the converted size in response to the curvature of the road.

6. The display method according to claim 1, wherein the plurality of vehicle seed images comprises at least one of a first seed image set showing a first side of the vehicle or a second seed image set showing a second side of the vehicle and a seed image facing forwards.

7. The display method according to claim 6, wherein:
    when the plurality of vehicle seed images comprises any one of the first seed image set and the second seed image set,
    converting the selected second seed image comprises reversing the selected second seed image between left and right depending on a direction of the third lateral distance.

8. The display method according to claim 1, further comprising:
    disposing a third seed image indicating a target inter-vehicle distance at the display origin;
    converting a size of the third seed image disposed at the display origin based on a longitudinal distance corresponding to the target inter-vehicle distance using a vanishing point of a lane having a curvature of zero (0) as an anchor point; and
    compensating for lateral coordinates of the third seed image having the converted size in response to the curvature of the road.

9. A non-transitory computer-readable recording medium containing a program recorded thereon, the program to direct a processor to perform acts of:
    acquiring environment information;
    selecting, among a plurality of lane surface seed images having different curvatures, a first seed image corresponding to a curvature of a road on which driving of a vehicle is currently performed based on the acquired environment information;
    disposing the selected first seed image at a display origin corresponding to a vehicle origin;
    primarily distorting the first seed image disposed at the display origin in a direction toward a target lane surface that becomes a display target based on a host vehicle in response to a first lateral distance of an adjacent lane division line located in the direction toward the target lane surface;
    secondarily distorting the primarily distorted first seed image in the direction toward the target lane surface in response to a half of a lane width of a driving lane of the host vehicle;
    selecting a second seed image corresponding to a third lateral distance between a nearby vehicle and the vehicle origin, a first longitudinal distance therebetween, and the curvature of the road based on the acquired environment information, from among a plurality of vehicle seed images having shapes viewed at different angles;
    converting the selected second seed image based on the third lateral distance, the first longitudinal distance, and the curvature of the road; and
    outputting the secondarily distorted first seed image through a display unit.

10. A vehicle comprising:
a sensor unit and navigation system configured to acquire environment information; and
a driving environment display device configured to output driving environment information based on the acquired environment information,
wherein
the driving environment display device comprises:
a controller configured to:
select, among a plurality of lane surface seed images having different curvatures, a first seed image corresponding to a curvature of a road on which driving is currently performed based on the acquired environment information to dispose the selected first seed image at a display origin corresponding to a vehicle origin,
primarily distort the first seed image disposed at the display origin in a direction toward a target lane surface that becomes a display target based on a host vehicle in response to a first lateral distance of an adjacent lane division line located in the direction toward the target lane surface, and
secondarily distort the primarily distorted first seed image in the direction toward the target lane surface in response to a half of a lane width of a driving lane of the host vehicle; and
a display unit configured to output the secondarily distorted first seed image,
where: the controller is further configured to:
select, among a plurality of vehicle seed images having shapes viewed at different angles, a second seed image corresponding to a third lateral distance between a nearby vehicle and the vehicle origin, a first longitudinal distance therebetween, and the curvature of the road based on the acquired environment information, from and
convert the selected second seed image based on the third lateral distance, the first longitudinal distance, and the curvature of the road, and
the display unit configured to output the converted second seed image.

11. The vehicle according to claim 10, wherein the vehicle origin is a position corresponding to a middle of the host vehicle in a lateral direction.

12. The vehicle according to claim 11, wherein:
the first lateral distance corresponds to a distance from the vehicle origin to the adjacent lane division line, and
the lane width is a value obtained by adding the first lateral distance to a second lateral distance from the vehicle origin to a lane division line located in an opposite direction to the adjacent lane division line.

13. The vehicle according to claim 10, wherein the distortion comprises a skew function transform applied horizontally by an angle corresponding to the first lateral distance or the half of the lane width using a vanishing point of a lane having a curvature of 0 as an anchor point.

14. The vehicle according to claim 10, wherein the controller is further configured to:
dispose the selected second seed image at the display origin,
horizontally move coordinates of the selected second seed image disposed at the display origin in response to the third lateral distance,
convert a size of the second seed image having the moved coordinates based on the first longitudinal distance using a vanishing point of a lane having a curvature of zero (0) as an anchor point, and
compensate for lateral coordinates of the second seed image having the converted size in response to the curvature of the road.

15. The vehicle according to claim 10, wherein the plurality of vehicle seed images comprises at least one of a first seed image set showing a first side of the vehicle or a second seed image set showing a second side of the vehicle and a seed image facing forwards.

16. The vehicle according to claim 15, wherein:
when the plurality of vehicle seed images comprises any one of the first seed image set and the second seed image set,
the controller is configured to reverse the selected second seed image between left and right depending on a direction of the third lateral distance.

17. The vehicle according to claim 10, wherein the controller is configured to:
dispose a third seed image indicating a target inter-vehicle distance at the display origin,
convert a size of the third seed image disposed at the display origin based on a longitudinal distance corresponding to the target inter-vehicle distance using a vanishing point of a lane having a curvature of zero (0) as an anchor point, and
compensate for lateral coordinates of the third seed image having the converted size in response to the curvature of the road.

* * * * *

UNITED STATES PATENT AND TRADEMARK OFFICE
CERTIFICATE OF CORRECTION

PATENT NO. : 11,682,337 B2
APPLICATION NO. : 17/554577
DATED : June 20, 2023
INVENTOR(S) : Wook Jin Shin It is certified that error appears in the above-identified patent and that said Letters Patent is hereby corrected as shown below:

In the Claims

Claim 10, Line 30 "where:" should be replaced with "wherein"

Signed and Sealed this
Fifteenth Day of August, 2023

Katherine Kelly Vidal
*Director of the United States Patent and Trademark Office*